(12) United States Patent
Pica et al.

(10) Patent No.: US 8,543,659 B2
(45) Date of Patent: Sep. 24, 2013

(54) APPARATUS AND METHOD FOR USER EQUIPMENT BATTERY INFORMATION REPORTING

(75) Inventors: Francesco Pica, San Diego, CA (US); Long Duan, San Diego, CA (US); Amer Catovic, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 264 days.

(21) Appl. No.: 13/035,724

(22) Filed: Feb. 25, 2011

(65) Prior Publication Data

US 2012/0054304 A1 Mar. 1, 2012

Related U.S. Application Data

(60) Provisional application No. 61/309,666, filed on Mar. 2, 2010.

(51) Int. Cl.
*G06F 15/16* (2006.01)
(52) U.S. Cl.
USPC .............. 709/217; 709/206; 710/8; 710/14
(58) Field of Classification Search
USPC .............................................. 709/206, 217
See application file for complete search history.

(56) References Cited

U.S. PATENT DOCUMENTS

| | | | |
|---|---|---|---|
| 6,772,236 B1 * | 8/2004 | Williams et al. | 710/19 |
| 8,103,266 B2 * | 1/2012 | Fok et al. | 455/423 |
| 8,134,943 B2 * | 3/2012 | Song et al. | 370/312 |
| 2004/0180701 A1 | 9/2004 | Livet et al. | |
| 2004/0249988 A1 * | 12/2004 | Williams et al. | 710/1 |
| 2006/0200658 A1 | 9/2006 | Penkethman | |
| 2006/0217152 A1 | 9/2006 | Fok et al. | |
| 2009/0063715 A1 * | 3/2009 | de Cesare et al. | 710/5 |
| 2009/0146826 A1 * | 6/2009 | Gofman et al. | 340/636.2 |

FOREIGN PATENT DOCUMENTS

| | | |
|---|---|---|
| WO | WO9509512 A1 | 4/1995 |
| WO | WO2008087535 A2 | 7/2008 |
| WO | WO2011018104 A1 | 2/2011 |

OTHER PUBLICATIONS

International Search Report and Written Opinion—PCT/US2011/026661, ISA/EPO—Jul. 4, 2011.

* cited by examiner

*Primary Examiner* — Jude Jean Gilles
(74) *Attorney, Agent, or Firm* — Abdollah Katbab (57) ABSTRACT

An apparatus and method for reporting battery information including receiving configuration information including a reporting mode from a network entity; collecting the battery information of a user equipment (UE); preparing the battery information in the reporting mode; and sending the battery information in the reporting mode over a communications transport mechanism to the network entity. In one aspect, the apparatus and method receive battery information including selecting and configuring a reporting mode; sending configuration information over a communications transport mechanism to a user equipment (UE); and receiving the battery information from the UE, wherein the UE uses the configuration information and the reporting mode.

35 Claims, 8 Drawing Sheets

APPARATUS AND METHOD FOR USER EQUIPMENT BATTERY INFORMATION REPORTING

CLAIM OF PRIORITY UNDER 35 U.S.C. §119

The present application for patent claims priority to Provisional Application No. 61/309,666 entitled "UE Battery Status Reporting" filed Mar. 2, 2010, and assigned to the assignee hereof and hereby expressly incorporated by reference herein.

FIELD

This disclosure relates generally to apparatus and methods for mobile wireless communications. More particularly, the disclosure relates to battery information reporting in wireless communication systems.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In one aspect, one of the new features associated with advanced LTE technology is a Minimization of Drive Test (MDT) feature, which is specified in 3GPP standards. This feature allows the operator to engage commercial mobile devices in collecting information about network performance and coverage quality thus avoiding the need to perform drive test campaigns. In another aspect, similar features are also being introduced in non-3GPP standards, such as an Open mobile Alliance (OMA). For example, collection of the network performance and coverage quality information may be an additional activity for a commercial mobile device which consumes additional battery energy. It is therefore advantageous to engage those mobile devices that have sufficient remaining battery capacity. Besides MDT, there can be other optional activities that mobile devices may be requested to perform and for which the remaining battery capacity may be one of the criteria used to select the mobile devices to be engaged by the network. Therefore, there is a clear need for a mechanism to report the battery information from the mobile device to the network.

SUMMARY

Disclosed is an apparatus and method for reporting and/or receiving battery information. According to one aspect, a method for reporting battery information including receiving configuration information including a reporting mode from a network entity; collecting the battery information of a user equipment (UE); preparing the battery information in the reporting mode; and sending the battery information in the reporting mode over a communications transport mechanism to the network entity.

According to another aspect, a method for receiving battery information including selecting and configuring a reporting mode; sending configuration information including the reporting mode over a communications transport mechanism to a user equipment (UE); and receiving the battery information from the UE, wherein the UE uses the configuration information and the reporting mode.

According to another aspect, an apparatus including a processor and a memory, the memory containing program code executable by the processor for performing the following: receiving configuration information including a reporting mode from a network entity; collecting battery information of a user equipment (UE); preparing the battery information in the reporting mode; and sending the battery information in the reporting mode over a communications transport mechanism to the network entity.

According to another aspect, an apparatus including a processor and a memory, the memory containing program code executable by the processor for performing the following: selecting and configuring a reporting mode; sending configuration information including the reporting mode over a communications transport mechanism to a user equipment (UE); and receiving battery information from the UE, wherein the UE uses the configuration information and the reporting mode.

According to another aspect, an apparatus for reporting battery information including means for receiving configuration information including a reporting mode from a network entity; means for collecting the battery information of a user equipment (UE); means for preparing the battery information in the reporting mode; and means for sending the battery information in the reporting mode over a communications transport mechanism to the network entity.

According to another aspect, an apparatus for receiving battery information including means for selecting and configuring a reporting mode; means for sending configuration information including the reporting mode over a communications transport mechanism to a user equipment (UE); and means for receiving the battery information from the UE, wherein the UE uses the configuration information and the reporting mode.

According to another aspect, a computer program product, including a computer-readable medium including codes for causing a computer to receive configuration information including a reporting mode from a network entity; codes for causing the computer to collect battery information of a user equipment (UE); codes for causing the computer to prepare the battery information in the reporting mode; and codes for causing the computer to send the battery information in the reporting mode over a communications transport mechanism to the network entity.

According to another aspect, a computer program product, including a computer-readable medium including codes for causing a computer to select and configure a reporting mode; codes for causing the computer to send the configuration information including the reporting mode over a communications transport mechanism to a user equipment (UE); and codes for causing the computer to receive battery information from the UE, wherein the UE uses the configuration information and the reporting mode.

Advantages of the present disclosure may include allowing a wireless network to optimize a tradeoff between battery consumption and network performance or service quality as perceived by the end user. Moreover, the optimization may be tailored to each individual end user.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

In one aspect, current wireless systems based on different wireless standards such as but not limited to 3GPP, 3GPP2, IEEE802.16e, etc., including Universal Mobile Telecommunications System (UMTS), Long Term Evolution (LTE), Evolution Data Optimized (EvDO), and Worldwide Interoperability for Microwave Access (WiMax), provide mechanisms to control the tradeoff between battery consumption of a mobile device (e.g. by controlling the frequency of UE dormancy cycles or by controlling access of the UE to high speed channels) and network utilization efficiency and delivered quality of service (QoS) to the user. In one example, the network may select a desired tradeoff based on different types of:

Events or conditions, for example, user plane data inactivity, type of application or traffic, throughput, etc.

UE indications or reports, for example, device type, UE buffer size, etc.

In some wireless systems, the network may not have information regarding the current status of the mobile device battery capacity which may be used by the network for decision making. Such information may allow the network to determine the benefit of modifying current tradeoff settings based on, for example, how critical the battery consumption of a particular mobile device is at a particular time. For example, by knowing the current battery information of a mobile device, the network could manage the network resources more efficiently from the UE battery life viewpoint. Reporting of battery-related information may allow the wireless network to determine more optimally a tradeoff between UE battery consumption and end user quality of service perception, for example. Specifically, in one example, reporting of battery-related information may allow the wireless network to engage in optional activities, such as MDT, with only those UEs whose battery level is deemed sufficient thus providing the optimal tradeoff mentioned above.

Figure 1:
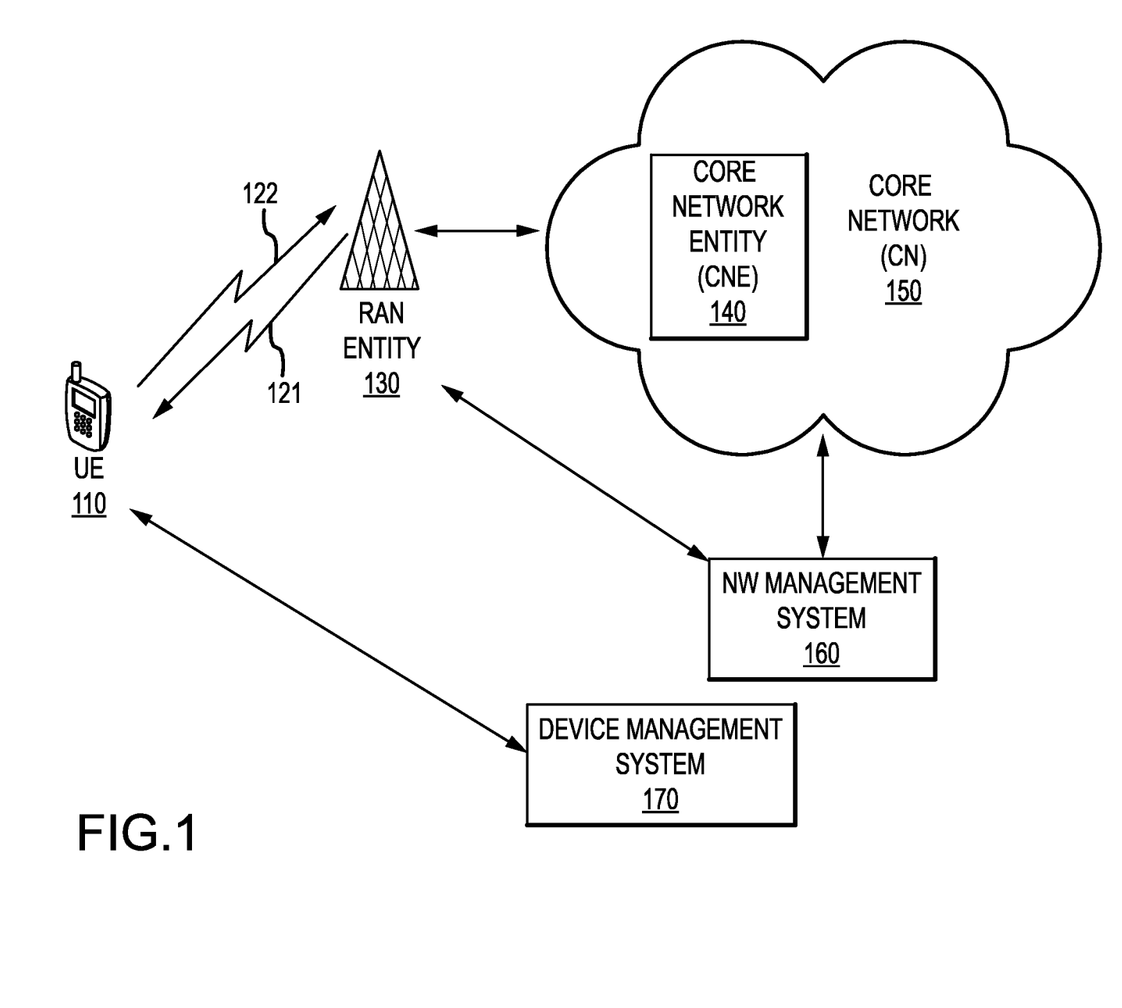
FIG. 1 illustrates an example block diagram of a wireless communication system which implements aspects in accordance with the present disclosure.

FIG. 1 illustrates an example block diagram of a wireless communication system which implements aspects in accordance with the present disclosure. A user equipment (UE) or mobile device 110 is a communication device for a mobile user which provides user access to a wireless network through access links 121, 122. A UE may be a portable device which obtains its energy from a battery. In one example, battery capacity is measured in a unit which is a product of electrical current and time, for example, milliampere-hours (mA-h) or ampere-hours (A-h). A radio access network (RAN) entity 130 is a network entity for the UE in the wireless network. In one example, the RAN entity may be a NodeB, eNodeB, Radio Network Controller (RNC), etc. Access links include a forward link 121, for example, from RAN entity 130 to UE 110. Also, access links include a reverse link 122, for example, from UE 110 to RAN entity 130. The RAN entity 130 is connected to a core network entity (CNE) 140 which is part of a core network (CN) 150. In one example, the core network entity may be a mobile switching center (MSC), a serving general packet radio service (GPRS) switching node (SGSN), a mobility management entity (MME), etc. In a further example, the CN is connected to a network management system 160 which may be responsible for overall wireless system management, for example, resource management, fault management, network operations, billing, authentication, security, etc. In addition, the CN may also be connected to a device management system 170 which controls mobile devices using, for example, an Open Mobile Alliance Device Management (OMA-DM) protocol.

In one aspect, the present disclosure relates to informing a wireless network on the current battery status and level of the mobile device. For example, information may be reported as a total available battery capacity, e.g., in units of mA-h or A-h, or as a percentage of the maximum capacity, or as a remaining time for the battery operation given a current consumption rate, or as an amount of data downloadable or uploadable or the expected talk time with the current remaining battery capacity, or a combination of any of these factors. The battery information (e.g., battery capacity information, battery consumption information, battery status, etc.) may be reported in several reporting modes, including periodic mode, event-triggered mode and other modes, including a combination of periodic mode and event-triggered mode. In one aspect, the network is able to configure, activate or deactivate UE battery information reporting so that it is used only if needed or desired.

In one aspect, the network configures battery information reporting in the UE. For example, the network may configure, activate or deactivate the reporting mode, as described above. For periodic reporting, the network may configure the reporting period or reporting interval. For event-triggered reporting the network may configure the report-triggering event. Examples of report-triggering events may include: "UE battery level below a first threshold" or "UE battery level above a second threshold", wherein the first threshold and second threshold are parameters configured by the network and sent to the UE.

In one aspect, multiple entities in the network are responsible for the configuration of battery-related information reporting. Examples of such network entities may include:
  Radio access network (RAN) entity (e.g. eNodeB in LTE, RNC in UMTS, etc.)
  Core network (CN) entity (e.g. MSC or SGSN in UMTS, MME in LTE, etc.)
  Management system entity (e.g. network manager or element manager, Device Management System (DMS) etc.)

In one example, information reporting and configuration for a UE battery may be realized using different communications transport mechanisms which may include the following. In the example where the network entity is a RAN entity, the communications transport mechanism for battery-related information and configuration occurs logically between the UE and a RAN entity, e.g. by using Access Stratum (AS) level signaling, for example, radio resource controller (RRC) messages in UMTS/LTE.

In the example where the network entity is a CN entity, the communications transport mechanism for battery-related information and configuration may or may not involve the RAN. The battery-related information and configuration communications transport may occur between the UE and the CN entity, for example, at a Non-Access Stratum (NAS) level, transparently to the RAN.

In the example where the network entity is a management system entity, the communications transport mechanism may or may not involve the RAN or the CN. The battery-related information and configuration communications transport may occur between the UE and the Management system entity, for example, via a user plane, transparently to the RAN. In one example, the transport mechanism uses a transport protocol based on Open Mobile Alliance Device Management (OMA-DM). In one example, OMA-DM is used for UE management such as provisioning, device configuration, software updates, fault management, etc.

Figure 2:
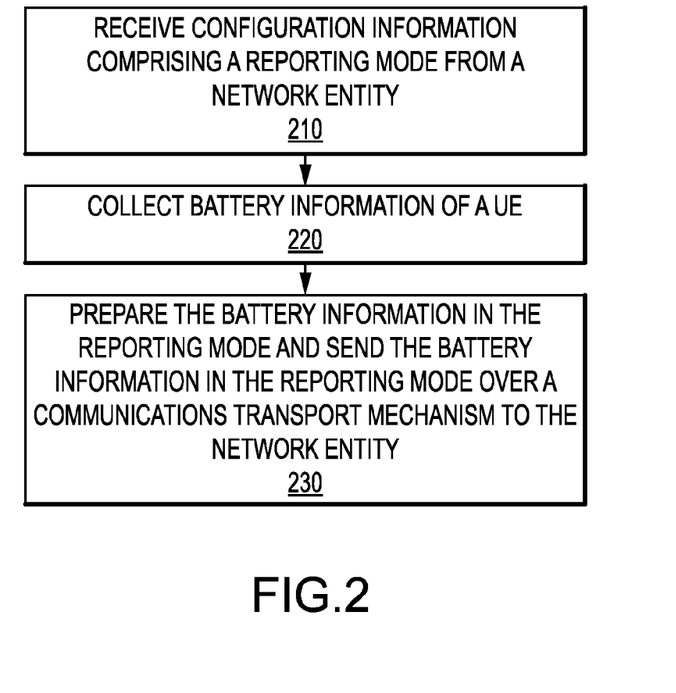
FIG. 2 illustrates an example flow diagram for reporting battery information.

FIG. 2 illustrates an example flow diagram for reporting battery information. In block 210, receive configuration information comprising a reporting mode from a network entity. In one example, the network entity configures, activates or deactivates UE battery information reporting, so that it is used only if needed or desired. That is, a reporting mode may be part of the configuration information. In one example, the network entity is one of the following: a RAN entity, a core network (CN) entity or a management system entity.

In block 220, collect battery information of a UE. In one example, battery information may include one or more of the following: battery capacity information, battery consumption information, etc. For example, the battery consumption information may be expressed as a total available battery capacity, in units of mA-h or A-h, for example. In another example, battery consumption information is expressed as a percentage of maximum capacity. In another example, battery consumption information is expressed as remaining time for battery operation, given a present consumption rate. In another example, battery consumption information is expressed as an amount of data downloadable or uploadable or the expected talk time with the current remaining battery capacity. In another example, battery consumption information may be any combination of these factors.

In block 230, prepare the battery information in the reporting mode and send the battery information in the reporting mode over a communications transport mechanism to the network entity. For example, the reporting mode is one of the following: a periodic mode, an event-triggered mode, or a combination of periodic mode and event-triggered mode. In one example, the communications transport mechanism is between the UE and a RAN entity. For example, the communications transport mechanism uses Access Stratum (AS) signaling. For example, the AS signaling uses Radio Resource Controller (RRC) signaling. In another example, the communications transport mechanism is between the UE and a Core Network Entity (CNE). For example, the communications transport mechanism uses Non-Access Stratum (NAS) signaling. For example, the communications transport mechanism is transparent to the RAN entity. In another example, the communications transport mechanism is between the UE and a management system entity. For example, the communications transport mechanism is via a user plane. In one example, the communications transport mechanism uses a transport protocol based on Open Mobile Alliance Device Management (OMA-DM). In one example, the communications transport protocol is used for UE management such as provisioning, device configuration, software updates, fault management, etc.

Figure 3:
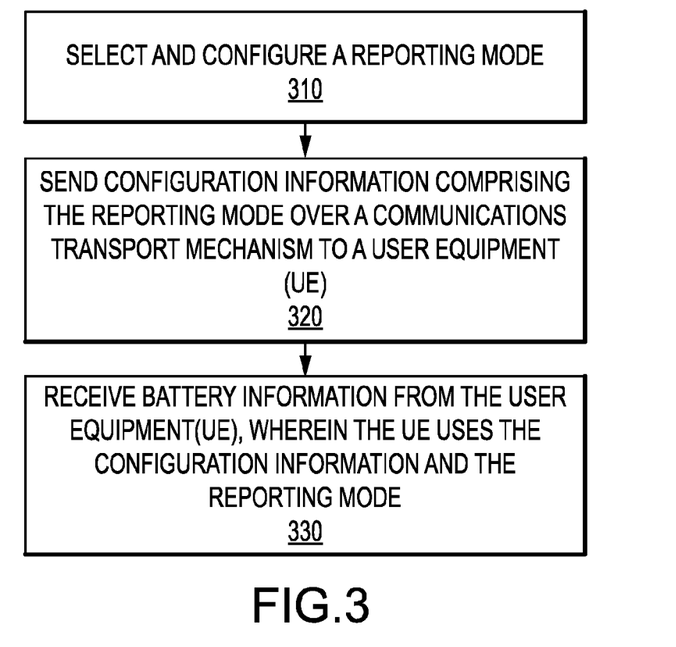
FIG. 3 illustrates an example flow diagram for receiving battery information.

FIG. 3 illustrates an example flow diagram for receiving battery information. In block 310, select and configure a reporting mode. In one example, the configuration may include activating the UE battery information reporting. That is, a reporting mode may be part of the configuration information. In one example, the reporting mode is a periodic mode. For example, periodic mode may be based on a reporting period or reporting interval. In another example, the reporting mode is an event-triggered mode. For example, event-triggered mode may be based on a report-triggering event. Examples of report-triggering events may include: "UE battery level below a first threshold" or "UE battery level above a second threshold", wherein the first threshold and second threshold are parameters configured by the network and sent to the UE.

In block 320, send configuration information comprising the reporting mode over a communications transport mechanism to a user equipment (UE). In one example, the communications transport mechanism is between a RAN entity and the UE. For example, the communications transport mechanism uses Access Stratum (AS) signaling. For example, the AS signaling uses Radio Resource Controller (RRC) signaling. In another example, the communications transport mechanism is between a Core Network Entity (CNE) and the UE. For example, the communications transport mechanism uses Non-Access Stratum (NAS) signaling. For example, the communications transport mechanism is transparent to the RAN entity. In another example, the communications transport mechanism is between a management system entity and the UE. For example, the transport mechanism is via a user plane. In one example, the transport mechanism uses a transport protocol based on Open Mobile Alliance Device Management (OMA-DM). In one example, the transport protocol is used for UE management such as provisioning, device configuration, software updates, fault management, etc.

In block 330, receive battery information from the user equipment (UE), wherein the UE uses the configuration information and the reporting mode. In one example, the battery information may include one or more of the following: battery capacity information, battery consumption information, battery status, etc. In one example, battery consumption information is a total available battery capacity, in units of mA-h or A-h, for example. In another example, battery consumption information is a percentage of maximum capacity. In another example, battery consumption information is a remaining time for battery operation, given a present consumption rate. In another example, battery consumption information is an amount of data downloadable or uploadable or the expected talk time with the current remaining battery capacity. In another example, the battery information is received using the same communications transport mechanism. In another example, the battery information is received using a different communications transport mechanism.

Figure 4:
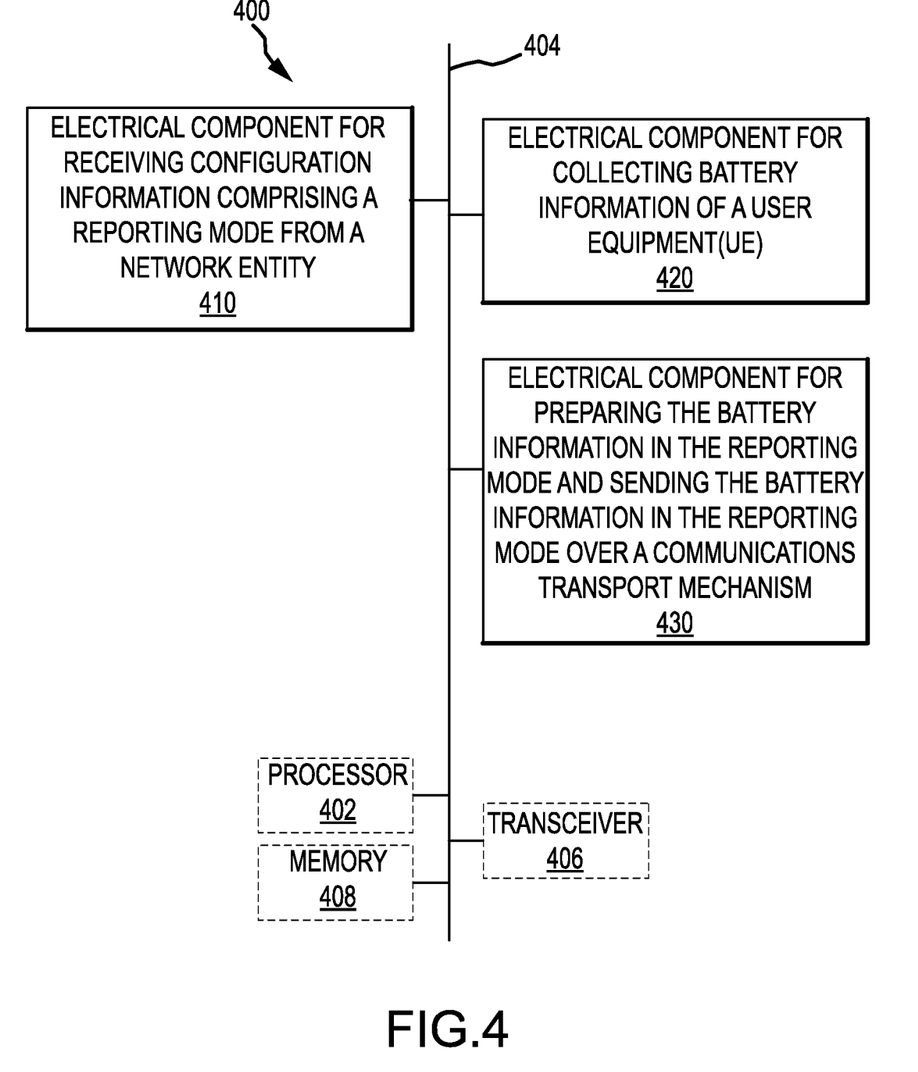
FIG. 4 illustrates an example of a first device for reporting battery information.

FIG. 4 illustrates an example of a first device 400 for reporting battery information. The device 400 may be configured as a communication device or as a processor or similar device for use within the communication device. As depicted, device 400 may include functional blocks that can represent functions implemented by a processor, software, hardware or combination thereof (e.g., firmware). As illustrated, device 400 may include an electrical component 410 for receiving configuration information comprising a reporting mode from a network entity. The device 400 may include an electrical component 420 for collecting battery information of a user equipment (UE). The device 400 may include an electrical component 430 for preparing the battery information in the reporting mode and sending the battery information in the reporting mode over a communications transport mechanism. Device 400 may optionally include a processor module 402 having at least one processor. In one aspect, device 400 may be configured as a network entity, rather than as a processor. Processor 402, in such case, may be in operative communication with electrical components 410-430 via a bus 404 or a similar communication coupling. Processor 402 may effect initiation and scheduling of the processes or functions performed by electrical components 410-430. In related aspects, device 400 may include a transceiver module 406. A stand-alone receiver and/or stand-alone transmitter may be used in lieu of or in conjunction with transceiver module 406. In further related aspects, device 400 may optionally include a module for storing information, such as, for example, a memory module 408. The memory module 408 may include a computer readable medium and may be operatively coupled to the other components of device 400 via a bus 404 or the like. The memory module 408 may be adapted to store computer readable codes, instructions and/or data for effecting the processes and behavior of electrical components 410-430, and subcomponents thereof, or processor 402, or the methods disclosed herein. Memory module 408 may retain codes/instructions for executing functions associated with electrical components 410-430. While shown as being external to memory module 408, it is to be understood that electrical components 410-430 may exist within memory module 408.

Figure 5:
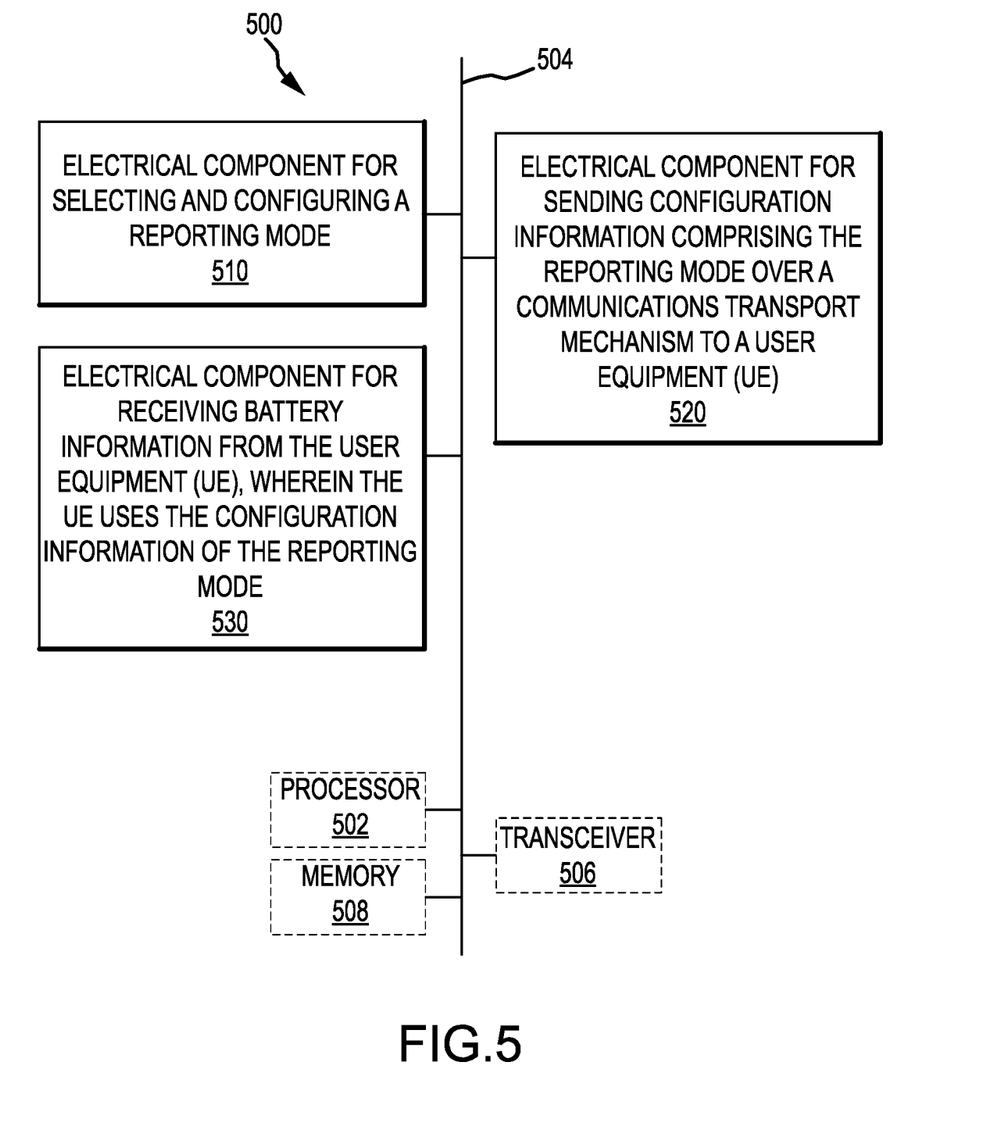
FIG. 5 illustrates an example of a first device for receiving battery information.

FIG. 5 illustrates an example of a first device 500 for receiving battery information. The device 500 may be configured as a communication device or as a processor or similar device for use within the communication device. As depicted, device 500 may include functional blocks that can represent functions implemented by a processor, software, hardware or combination thereof (e.g., firmware). As illustrated, device 500 may include an electrical component 510 for selecting and configuring a reporting mode. The device 500 may include an electrical component 520 for sending the configuration information comprising the reporting mode over a communications transport mechanism to a user equipment (UE). The device 500 may include an electrical component 530 for receiving battery information from the user equipment (UE), wherein the UE uses the configuration information and the reporting mode. Device 500 may optionally include a processor module 502 having at least one processor. In one aspect, device 500 may be configured as a network entity, rather than as a processor. Processor 502, in such case, may be in operative communication with electrical components 510-530 via a bus 504 or a similar communication coupling. Processor 502 may effect initiation and scheduling of the processes or functions performed by electrical components 510-530. In related aspects, device 500 may include a transceiver module 506. A stand-alone receiver and/or stand-alone transmitter may be used in lieu of or in conjunction with transceiver module 506. In further related aspects, device 500 may optionally include a module for storing information, such as, for example, a memory module 508. The memory module 508 may include a computer readable medium and may be operatively coupled to the other components of device 500 via a bus 504 or the like. The memory module 508 may be adapted to store computer readable codes, instructions and/or data for effecting the processes and behavior of electrical components 510-530, and subcomponents thereof, or processor 502, or the methods disclosed herein. Memory module 508 may retain codes/instructions for executing functions associated with electrical components 510-530. While shown as being external to memory module 508, it is to be understood that electrical components 510-530 may exist within memory module 508.

One skilled in the art would understand that the steps disclosed in the example flow diagrams in FIGS. 2 and 3 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art. In one aspect, the computer-readable medium includes non-transitory computer-readable medium.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 6:
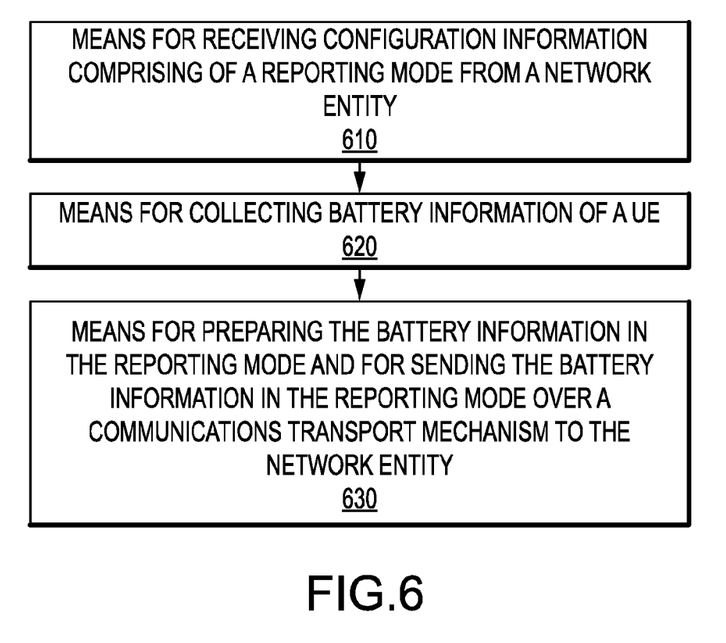
FIG. 6 illustrates an example of a second device for reporting battery information.

FIG. 6 illustrates an example of a second device 600 for reporting battery information. In one aspect, the device 600 is implemented by at least one processor including one or more modules configured to provide different aspects of reporting battery information as described herein in blocks 610, 620 and 630. For example, each module includes hardware, firmware, software, or any combination thereof. In one aspect, the device 600 is also implemented by at least one memory in communication with the at least one processor.

Figure 7:
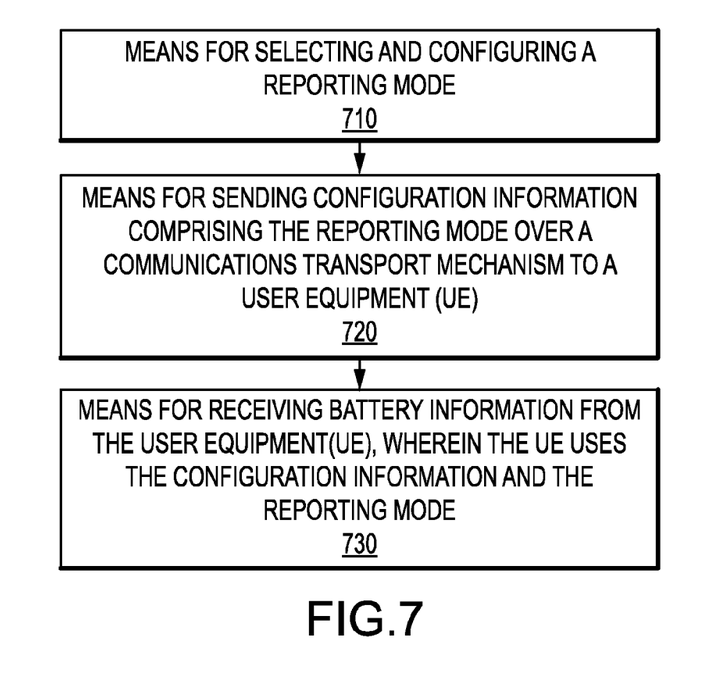
FIG. 7 illustrates an example of a second device 700 for receiving battery information.

FIG. 7 illustrates an example of a second device 700 for receiving battery information. In one aspect, the device 700 is implemented by at least one processor including one or more modules configured to provide different aspects of receiving battery information as described herein in blocks 710, 720 and 730. For example, each module includes hardware, firmware, software, or any combination thereof. In one aspect, the device 700 is also implemented by at least one memory in communication with the at least one processor.

Figure 8:
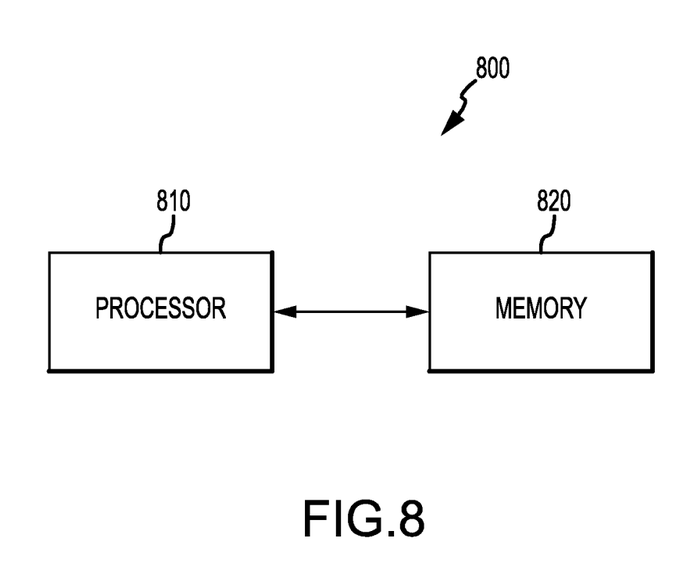
FIG. 8 illustrates an example of a device including a processor in communication with a memory for executing the processes for reporting or receiving battery information.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 8 illustrates an example of a device 800 including a processor 810 in communication with a memory 820 for executing the processes for reporting or receiving battery information. In one example, the device 800 is used to implement the algorithms illustrated in FIGS. 2 and 3. In one aspect, the memory 820 is located within the processor 810. In another aspect, the memory 820 is external to the processor 810. In one aspect, the processor includes circuitry for implementing or performing the various flow diagrams, logical blocks and/or modules described herein.

Figure 9:
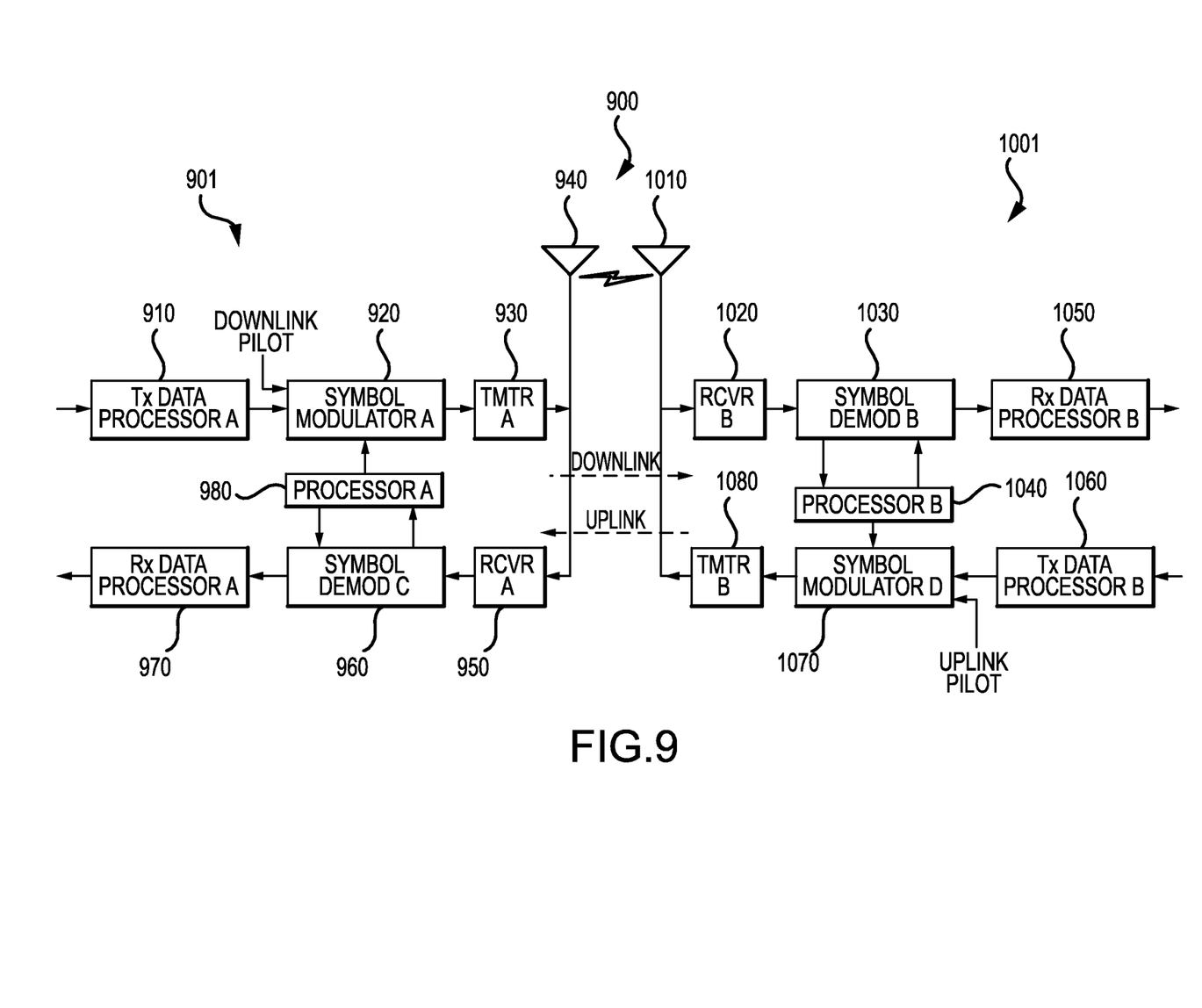
FIG. 9 is a block diagram illustrating an example of a two terminal system, for example, a network entity/UE system.

FIG. 9 is a block diagram illustrating an example of a two terminal system, for example, a network entity/UE system 900. One skilled in the art would understand that the example network entity/UE system 900 illustrated in FIG. 9 may be implemented in an FDMA environment, an OFDMA environment, a CDMA environment, a WCDMA environment, a TDMA environment, a SDMA environment or any other suitable wireless environment.

The network entity/UE system 900 includes an network entity 901 (e.g., a RAN entity, a core network (CN) entity or a management system entity) and a user equipment or UE 1001 (e.g., wireless communication device). In the downlink leg, the network entity 901 includes a transmit (TX) data processor A 910 that accepts, formats, codes, interleaves and modulates (or symbol maps) traffic data and provides modulation symbols (e.g., data symbols). The TX data processor A 910 is in communication with a symbol modulator A 920. The symbol modulator A 920 accepts and processes the data symbols and downlink pilot symbols and provides a stream of symbols. In one aspect, it is the symbol modulator A 920 that modulates (or symbol maps) traffic data and provides modulation symbols (e.g., data symbols). In one aspect, symbol modulator A 920 is in communication with processor A 980 which provides configuration information. Symbol modulator A 920 is in communication with a transmitter unit (TMTR) A 930. The symbol modulator A 920 multiplexes the data symbols and downlink pilot symbols and provides them to the transmitter unit A 930.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 930 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 1001 includes antenna 1010 for receiving the analog downlink signal and inputting the analog downlink signal to a receiver unit (RCVR) B 1020. In one aspect, the receiver unit B 1020 conditions, for example, filters, amplifies, and frequency downconverts the analog downlink signal to a first "conditioned" signal. The first "conditioned" signal is then sampled. The receiver unit B 1020 is in communication with a symbol demodulator B 1030. The symbol demodulator B 1030 demodulates the first "conditioned" and "sampled" signal (e.g., data symbols) outputted from the receiver unit B 1020. One skilled in the art would understand that an alternative is to implement the sampling process in the symbol demodulator B 1030. The symbol demodulator B 1030 is in communication with a processor B 1040. Processor B 1040 receives downlink pilot symbols from symbol demodulator B 1030 and performs channel estimation on the downlink pilot symbols. In one aspect, the channel estimation is the process of characterizing the current propagation environment. The symbol demodulator B 1030 receives a frequency response estimate for the downlink leg from processor B 1040. The symbol demodulator B 1030 performs data demodulation on the data symbols to obtain data symbol estimates on the downlink path. The data symbol estimates on the downlink path are estimates of the data symbols that were transmitted. The symbol demodulator B 1030 is also in communication with a RX data processor B 1050.

The RX data processor B 1050 receives the data symbol estimates on the downlink path from the symbol demodulator B 1030 and, for example, demodulates (i.e., symbol demaps), deinterleaves and/or decodes the data symbol estimates on the downlink path to recover the traffic data. In one aspect, the processing by the symbol demodulator B 1030 and the RX data processor B 1050 is complementary to the processing by the symbol modulator A 920 and TX data processor A 910, respectively.

In the uplink leg, the UE 1001 includes a TX data processor B 1060. The TX data processor B 1060 accepts and processes traffic data to output data symbols. The TX data processor B 1060 is in communication with a symbol modulator D 1070. The symbol modulator D 1070 accepts and multiplexes the data symbols with uplink pilot symbols, performs modulation and provides a stream of symbols. In one aspect, symbol modulator D 1070 is in communication with processor B 1040 which provides configuration information. The symbol modulator D 1070 is in communication with a transmitter unit B 1080.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 1010.

The analog uplink signal from UE 1001 is received by antenna 940 and processed by a receiver unit A 950 to obtain samples. In one aspect, the receiver unit A 950 conditions, for example, filters, amplifies and frequency downconverts the analog uplink signal to a second "conditioned" signal. The second "conditioned" signal is then sampled. The receiver unit A 950 is in communication with a symbol demodulator C 960. One skilled in the art would understand that an alternative is to implement the sampling process in the symbol demodulator C 960. The symbol demodulator C 960 performs data demodulation on the data symbols to obtain data symbol estimates on the uplink path and then provides the uplink pilot symbols and the data symbol estimates on the uplink path to the RX data processor A 970. The data symbol estimates on the uplink path are estimates of the data symbols that were transmitted. The RX data processor A 970 processes the data symbol estimates on the uplink path to recover the traffic data transmitted by the wireless communication device 1001. The symbol demodulator C 960 is also in communication with processor A 980. Processor A 980 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 980 and processor B 1040 direct (i.e., control, coordinate or manage, etc.) operation at the network entity 901 and at the UE 1001, respectively. In one aspect, either or both processor A 980 and processor B 1040 are associated with one or more memory units (not shown) for storing of program codes and/or data. In one aspect, either or both processor A 980 or processor B 1040 or both perform computations to derive frequency and impulse response estimates for the uplink leg and downlink leg, respectively.

In one aspect, the network entity/UE system 900 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 10:
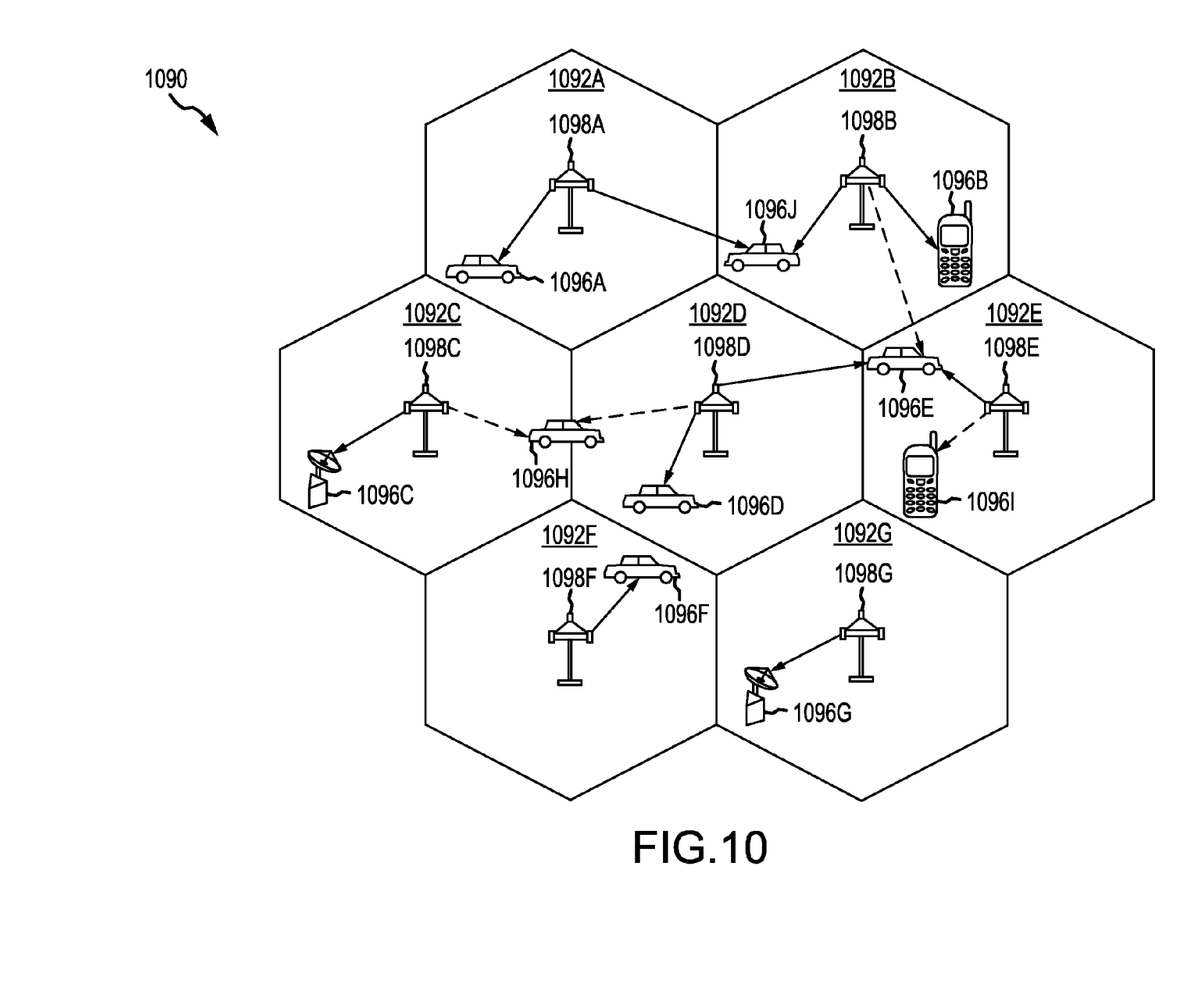
FIG. 10 illustrates an example of a wireless communications system 1090 that supports a plurality of user devices.

FIG. 10 illustrates an example of a wireless communications system 1090 that supports a plurality of user devices. In FIG. 10, reference numerals 1092A to 1092G refer to cells, reference numerals 1098A to 1098G refer to base stations (BS) or node Bs and reference numerals 1096A to 1096J refer to access user devices (a.k.a. user equipments (UE)). Cell size may vary. Any of a variety of algorithms and methods may be used to schedule transmissions in system 1090. System 1090 provides communication for a number of cells 1092A through 1092G, each of which is serviced by a corresponding base station 1098A through 1098G, respectively.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for reporting battery information, comprising:
    receiving configuration information comprising a reporting mode from a network entity;
    collecting the battery information of a user equipment (UE);
    preparing the battery information in the reporting mode; and
    sending the battery information in the reporting mode over a communications transport mechanism to the network entity.

2. The method of claim 1, wherein the network entity is one of the following: a RAN entity, a core network (CN) entity or a management system entity.

3. The method of claim 2 further comprising the network entity activating UE battery information reporting for use only if needed.

4. The method of claim 2, wherein the reporting mode is one of the following: a periodic mode, an event-triggered mode, or a combination of periodic mode and event-triggered mode.

5. The method of claim 1, wherein the battery information is expressed as one of the following: a total available battery capacity, a percentage of a maximum capacity, a remaining time for battery operation, a consumption rate or an amount of data downloadable or uploadable or the expected talk time with a current remaining battery capacity.

6. The method of claim 1, wherein the communications transport mechanism is between the UE and a radio access network (RAN) entity, and wherein the communications transport mechanism uses Access Stratum (AS) signaling.

7. The method of claim 1, wherein the communications transport mechanism is between the UE and a Core Network (CN) entity, and wherein the communications transport mechanism uses Non-Access Stratum (NAS) signaling.

8. The method of claim 1, wherein the communications transport mechanism is between the UE and a management system entity, and wherein the communications transport mechanism uses a transport protocol based on Open Mobile Alliance Device Management (OMA-DM).

9. A method for receiving battery information, comprising:
    selecting and configuring a reporting mode;
    sending configuration information comprising the reporting mode over a communications transport mechanism to a user equipment (UE); and
    receiving the battery information from the UE, wherein the UE uses the configuration information and the reporting mode.

10. The method of claim 9, wherein the reporting mode is one of the following: a periodic mode based on a reporting period or reporting interval, or an event-triggered mode based on a report-triggering event.

11. The method of claim 10, wherein the report-triggering event includes a) UE battery level below a first threshold or b) a UE battery level above a second threshold, wherein the first threshold and second threshold are parameters configured by the network and sent to the UE.

12. An apparatus comprising a processor and a memory, the memory containing program code executable by the processor for performing the following:
    receiving configuration information comprising a reporting mode from a network entity;
    collecting battery information of a user equipment (UE);
    preparing the battery information in the reporting mode; and
    sending the battery information in the reporting mode over a communications transport mechanism to the network entity.

13. The apparatus of claim 12, wherein the network entity is one of the following: a RAN entity, a core network (CN) entity or a management system entity.

14. The apparatus of claim 13, wherein the memory further comprising program code for activating UE battery information reporting for use only if needed.

15. The apparatus of claim 13, wherein the reporting mode is one of the following: a periodic mode, an event-triggered mode, or a combination of periodic mode and event-triggered mode.

16. The apparatus of claim 12, wherein the battery information is expressed as one of the following: a total available battery capacity, a percentage of a maximum capacity, a remaining time for battery operation, a consumption rate or an amount of data downloadable or uploadable or the expected talk time with a current remaining battery capacity.

17. The apparatus of claim 12, wherein the communications transport mechanism is between the UE and a radio access network (RAN) entity, and wherein the communications transport mechanism uses Access Stratum (AS) signaling.

18. The apparatus of claim 12, wherein the communications transport mechanism is between the UE and a Core Network Entity (CNE), and wherein the communications transport mechanism uses Non-Access Stratum (NAS) signaling.

19. The apparatus of claim 12, wherein the communications transport mechanism is between the UE and a management system entity, and wherein the communications transport mechanism uses a transport protocol based on Open Mobile Alliance Device Management (OMA-DM).

20. An apparatus comprising a processor and a memory, the memory containing program code executable by the processor for performing the following:
    selecting and configuring a reporting mode;

sending configuration information comprising the reporting mode over a communications transport mechanism to a user equipment (UE); and receiving battery information from the UE, wherein the UE uses the configuration information and the reporting mode.

21. The apparatus of claim 20, wherein the reporting mode is one of the following: a periodic mode based on a reporting period or reporting interval, or an event-triggered mode based on a report-triggering event.

22. The apparatus of claim 21, wherein the report-triggering event includes a) UE battery level below a first threshold or b) a UE battery level above a second threshold, wherein the first threshold and second threshold are parameters configured by the network and sent to the UE.

23. An apparatus for reporting battery information comprising:
means for receiving configuration information comprising a reporting mode from a network entity;
means for collecting the battery information of a user equipment (UE);
means for preparing the battery information in the reporting mode; and
means for sending the battery information in the reporting mode over a communications transport mechanism to the network entity.

24. The apparatus of claim 23, wherein the network entity is one of the following: a RAN entity, a core network (CN) entity or a management system entity.

25. The apparatus of claim 24 further comprising means for activating UE battery information reporting for use only if needed.

26. The apparatus of claim 24, wherein the reporting mode is one of the following: a periodic mode, an event-triggered mode, or a combination of periodic mode and event-triggered mode.

27. The apparatus of claim 23, wherein the battery information is expressed as one of the following: a total available battery capacity, a percentage of a maximum capacity, a remaining time for battery operation, a consumption rate or an amount of data downloadable or uploadable with a current remaining battery capacity.

28. The apparatus of claim 23, wherein the communications transport mechanism is between the UE and a radio access network (RAN) entity, and wherein the communications transport mechanism uses Access Stratum (AS) signaling.

29. The apparatus of claim 23, wherein the communications transport mechanism is between the UE and a Core Network Entity (CNE), and wherein the communications transport mechanism uses Non-Access Stratum (NAS) signaling.

30. The apparatus of claim 23, wherein the communications transport mechanism is between the UE and a management system entity, and wherein the communications transport mechanism uses a transport protocol based on Open Mobile Alliance Device Management (OMA-DM).

31. An apparatus for receiving battery information comprising:
means for selecting and configuring a reporting mode;
means for sending configuration information comprising the reporting mode over a communications transport mechanism to a user equipment (UE); and
means for receiving the battery information from the UE, wherein the UE uses the configuration information and the reporting mode.

32. The apparatus of claim 31, wherein the reporting mode is one of the following: a periodic mode based on a reporting period or reporting interval, or an event-triggered mode based on a report-triggering event.

33. The apparatus of claim 32, wherein the report-triggering event includes a) UE battery level below a first threshold or b) a UE battery level above a second threshold, wherein the first threshold and second threshold are parameters configured by the network and sent to the UE.

34. A computer program product, comprising:
a non-transitory computer-readable medium comprising:
codes for causing a computer to receive configuration information comprising a reporting mode from a network entity;
codes for causing the computer to collect battery information of a user equipment (UE);
codes for causing the computer to prepare the battery information in the reporting mode; and
codes for causing the computer to send the battery information in the reporting mode over a communications transport mechanism to the network entity.

35. A computer program product, comprising:
a non-transitory computer-readable medium comprising:
codes for causing a computer to select and configure a reporting mode;
codes for causing the computer to send the configuration information comprising the reporting mode over a communications transport mechanism to a user equipment (UE); and
codes for causing the computer to receive battery information from the UE, wherein the UE uses the configuration information and the reporting mode.

* * * * *